(12) United States Patent
Velner et al.

(10) Patent No.: US 11,238,322 B2
(45) Date of Patent: Feb. 1, 2022

(54) CALCULATING CORRECTION FACTORS FOR SUBSEQUENT PRINTING OPERATIONS BY WEIGHTING MEASURED ALIGNMENT DIFFERENCES

(71) Applicant: Hewlett-Packard Development Company, L.P., Spring, TX (US)

(72) Inventors: Eli Velner, Nes Ziona (IL); Oren Aks, Nes Ziona (IL); Nimrod Lucas, Nes Ziona (IL)

(73) Assignee: Hewlett-Packard Development Company, L.P., Spring, TX (US)

( * ) Notice: Subject to any disclaimer, the term of this patent is extended or adjusted under 35 U.S.C. 154(b) by 109 days.

(21) Appl. No.: 16/632,593

(22) PCT Filed: Nov. 29, 2017

(86) PCT No.: PCT/US2017/063778
§ 371 (c)(1),
(2) Date: Jan. 21, 2020

(87) PCT Pub. No.: WO2019/108182
PCT Pub. Date: Jun. 6, 2019

(65) Prior Publication Data
US 2021/0383179 A1      Dec. 9, 2021

(51) Int. Cl.
*G06K 15/00*      (2006.01)
*H04N 1/00*       (2006.01)

(52) U.S. Cl.
CPC ....... *G06K 15/408* (2013.01); *H04N 1/00045* (2013.01); *H04N 1/00063* (2013.01); *H04N 1/00084* (2013.01); *H04N 1/00087* (2013.01)

(58) Field of Classification Search
None
See application file for complete search history.

(56) References Cited

U.S. PATENT DOCUMENTS

| 6,342,323 | B1 | 1/2002 | Ma et al. |
| 6,842,538 | B2* | 1/2005 | Lee ............... G06K 9/4604 358/406 |
| 8,204,416 | B2 | 6/2012 | Calamita et al. |
| 8,571,460 | B2 | 10/2013 | deJong et al. |
| 8,839,718 | B2 | 9/2014 | Wiener et al. |
| 2005/0118514 | A1 | 6/2005 | Tsai |
| 2009/0016785 | A1 | 1/2009 | Haan et al. |
| 2009/0035030 | A1* | 2/2009 | Bae ............... H04N 1/00002 399/301 |

(Continued)

*Primary Examiner* — Dov Popovici
(74) *Attorney, Agent, or Firm* — HP Inc. Patent Department (57) ABSTRACT

A position of a first registration mark printed on a substrate during an earlier printing operation is detected. A second registration mark is printed on the substrate during a current printing operation at a position on the substrate relative to the first registration mark based on the detected position of the first registration mark and a correction factor. An alignment difference between the position of the first registration mark and the position of the second registration mark is measured. A new correction factor for a subsequent printing operation is calculated by weighting the measured alignment difference according to a difference between the measured alignment difference and a previous measured alignment difference.

15 Claims, 4 Drawing Sheets

(56) References Cited

U.S. PATENT DOCUMENTS

| | | |
|---|---|---|
| 2010/0047000 A1 | 2/2010 | Park et al. |
| 2011/0317182 A1* | 12/2011 | Murayama ......... G03G 15/5058 358/1.9 |
| 2012/0236647 A1 | 9/2012 | Pyeon et al. |
| 2013/0236647 A1 | 9/2013 | Samain et al. |
| 2014/0139851 A1* | 5/2014 | Mizes ................... B41J 29/393 358/1.9 |
| 2015/0023702 A1* | 1/2015 | Cho ................... H04N 1/00087 399/301 |
| 2017/0045854 A1 | 2/2017 | Miyake et al. |
| 2018/0079197 A1* | 3/2018 | Lucas ................ G01D 5/34746 |

\* cited by examiner

Figure 5

CALCULATING CORRECTION FACTORS FOR SUBSEQUENT PRINTING OPERATIONS BY WEIGHTING MEASURED ALIGNMENT DIFFERENCES

BACKGROUND

Printing devices sometimes need to print content so that it is aligned with content that has been printed in previous print operation. Alignment differences should be minimised in this printing process to ensure correct alignment. Sources of alignment differences may include, for example, wavy or glossy substrates, mechanical deviations (for instance deviations from an expected component position relative to other components), and inaccurate sensors.

For example, when printing on both sides of a substrate (duplex printing) content printed on the second (duplex) side of the substrate should be correctly aligned with respect to the content printed on the first (simplex) side of the substrate. Similar considerations apply when overprinting content printed on one side of the substrate with additional content.

Alignment differences may be detected by use of registration marks printed at the same time as the content. The timing of printing during a current print operation may be set according to the time of detection of a registration mark printed during a previous print operation. If such a registration mark is not detected at an expected position or time, potential alignment differences may be detected and subsequent print operations may be adjusted to correct the difference.

Some printing systems are web-fed. These systems print content to a continuous substrate that is subsequently cut into separate sheets, in contrast to sheet-fed systems in which content is printed to each sheet separately.

BRIEF INTRODUCTION OF THE DRAWINGS

Examples are further described hereinafter with reference to the accompanying drawings, in which.

DETAILED DESCRIPTION

In an example, a registration mark may be a mark with a defined shape. For example, a registration mark may be a pair of lines crossed lines overlaid on a shape such as a rectangle. If registration marks printed on both sides of a transparent substrate were perfectly aligned, it would appear to a person or sensor looking through the substrate that a single registration mark was present. In contrast, if a second registration mark printed on a second side of a transparent substrate was not perfectly aligned with a first registration mark printed on a first side of the substrate, the two registration marks would be visible and the difference in alignment could be measured. In web-fed printing, alignment differences are more likely to occur in the web (i.e. substrate) motion direction than the cross-web direction. However, it will be appreciated that alignment differences in the cross-web direction may also be measured and corrected. It will be appreciated that the mention of a transparent substrate is an example to more clearly illustrate the concept, and that the present disclosure is not limited to transparent substrate. Furthermore, the shape of registration mark described above is merely an example, and the present disclosure is not limited to any particular style or shape of registration mark. A registration mark may include any printed shape or other content, the position of which may be detected. Furthermore, in some examples, such as simplex overprinting, the registration marks may not be printed to overlap but may be printed with a planned offset (e.g. side by side), and alignment differences may be measured in relation to the planned offset. In duplex printing (that is, printing on both sides of a substrate), an alignment difference may be measured in terms of an offset distance by, for example, illuminating the substrate by a sufficiently powerful light source to enable the first and second registration marks to be simultaneously imaged by a single optical sensor. Alternatively, separate sensors arranged to image each side of the substrate to separately detect each registration mark may be used. In another example, the positions of the registration marks may be measured relative to a substrate edge, which may involve cutting the substrate into sheets in the case of web-fed printing. The alignment difference may also be detected based on the times of detection of registration marks (in place of directly measuring the deviation from the expected relative positions of the registration marks), which may involve comparing the measured offset between times of detection with an expected offset between times of detection based on the substrate velocity. Times of detection may be actual times, or may be based on a press main motor angle/encoder or press central timing encoder. That is, the times may be determined in relation to the angle of a main motor or some other internal clock of the apparatus. It will be appreciated that in order to detect differences between the times of detection for multiple registration marks or differences in relative times of detection, either an absolute time reference or a local reference such as an internal clock or other reference may be used.

Figure 1:
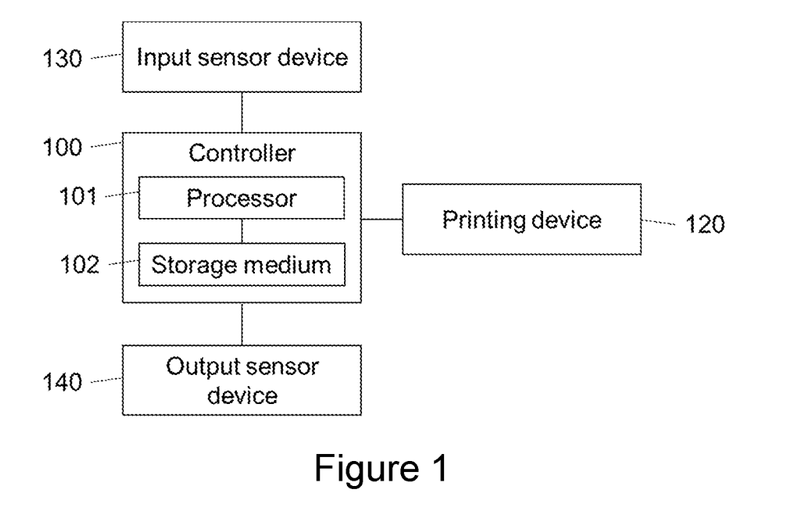
FIG. 1 shows an example of an apparatus according to an example of the disclosure.

FIG. 1 shows an example of an apparatus according to an example of the disclosure. The apparatus may comprise a controller 100, a printing device 120, an input sensor device 130, and an output sensor device 140. The printing device 120 may perform printing operations by moving and printing on a substrate. The printing device 120 may comprise a print head to print content on a substrate and a roller to move or assist the movement of a substrate. The input sensor device 130 and output sensor device 140 may detect registration marks and/or alignment differences between registration marks. The input sensor device 130 and output sensor device 140 may each comprise optical sensors or any other sensors suitable for detecting registration marks and alignment differences. The controller 100 may communicate with components such as the printing device 120, the input sensor device 130, and the output sensor device 140 and control the components to perform any of the methods described below. The controller 100 may comprise a processor 101 and a non-transitory machine readable storage medium 102 encoded with or comprising instructions or modules executable by the processor to perform any of the methods described below.

Figure 2:
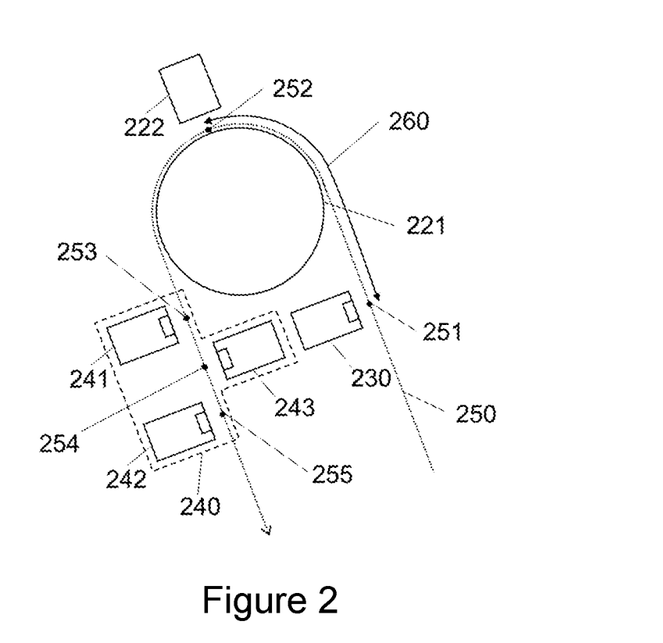
FIG. 2 shows an example of part of the apparatus of FIG. 1 according to an example of the disclosure.

FIG. 2 shows an example of an apparatus according to an example of the disclosure. The example illustrated in FIG. 2 shows some components of an example of the apparatus of FIG. 1 for performing a duplex side print operation in a web-fed printing system. As shown in FIG. 2 the apparatus may comprise a roller 221 to move or assist the movement of a substrate, a print head 222 to print an image including the second registration mark on the substrate, an input sensor device 230 to detect a first registration mark, and an output sensor device 240 to measure an alignment difference between the first registration mark and a second registration mark. The input sensor device 230 and output sensor device 240 may comprise optical sensors or any other sensors suitable for detecting registration marks.

In the example shown in FIG. 2, the output sensor device 240 is for duplex printing and comprises a first front sensor 241, a second front sensor 242, and a back sensor 243. The back sensor 243 may detect a first registration mark on a first side of a substrate. The first front sensor 241 and second front sensor 242 may detect a second registration mark on a second side of a substrate.

The path of the substrate through the apparatus is shown in FIG. 2 by dotted substrate path 250. Points 251-255 are points along the substrate path 250. Input sensor point 251 is the position of the input sensor device 230, which may be defined as the point at which the input sensor device 230 detects a registration mark. Second transfer point 252 is the point at which the print head 222 prints an image, and may also be referred to as the print position P. The distance 260 between the input sensor point 251 and the second transfer point 252 may be referred to as the reinsertion distance R. In this context "reinsertion" relates to the fact that for duplex printing the substrate has already passed through the same apparatus or a similar apparatus for printing on the simplex side, the apparatus of FIG. 2 printing on the duplex side. First front sensor point 253, back sensor point 254, and second front sensor point 255 are the positions of the first front sensor 241, back sensor 243, and second front sensor 242 respectively. As with the input sensor point 251, the first front sensor point 253, back sensor point 254, and second front sensor point 255 may be defined as the points at which the respective sensors detect a registration mark. The back sensor 243 is disposed between the first front sensor 241 and second front sensor 242 along the substrate path 250 (for instance, but not necessarily, halfway in-between). Where the back sensor is halfway in-between, more strictly the sensors are positioned such that the distance between the first front sensor point 253 and the back sensor point 254 along the substrate path 250 is equal to the distance between the back sensor point 254 and the second front sensor point 255 along the substrate path 250. That is, the back sensor 243 is arranged such that the position at which it would detect the first registration mark is halfway between the positions at which the first front sensor 241 and second front sensor 242 would detect the second registration mark. The outputs of the first front sensor 241, second front sensor 242, and back sensor 243 may be used to measure an alignment difference between the position of the first registration mark and second registration mark according to equation 1:

$$E_{F2B}=((((T_{F1}+T_{F2})/2)-T_B)\times V)+K \quad (1)$$

where $T_{F1}$ is the time that the second registration mark is detected by the first front sensor 241, $T_{F2}$ is the time that the second registration mark is detected by the second front sensor 242, $T_B$ is the time the first registration mark is detected by the back sensor 243, V is the substrate velocity and K is a correction constant. That is, measuring the alignment difference may comprise measuring a detection time offset between the detection of the first registration mark and the time of detection of the second registration mark and converting the offset to an alignment difference. The time of detection of the first registration mark may comprise an average of two separate times of detection $T_{F1}$ and $T_{F2}$ of the first registration mark at two separate sensors 241 and 242. Converting the detection time offset to an alignment difference may comprise adding a correction constant, K. The values used for V and K may be predetermined. In particular, the value of K may be determined on a regular or periodic basis by using the first front sensor 241, a second front sensor 242, and a back sensor 243 to detect the positions of registration marks corresponding to each sensor on a calibration target (not shown in FIG. 2) and comparing the results with accurate independently measurements of the positions of the registration marks on the calibration target.

The number and positions of sensors in the output sensor device 240 shown in FIG. 2 are merely examples, and a different arrangement of sensors could be used. For example, in duplex printing a single front sensor could be used with a single back sensor, and the sensors could be positioned facing each other such that the position at which the back sensor would detect the first registration mark is in the same location on the substrate path 250 as the position at which the front sensor would detect the second registration mark. However, in this arrangement the sensors might interfere with each other, particularly in the case of substrates that are not opaque. This could be overcome by offsetting the front and back sensor positions with respect to each other along the substrate path 250. However, such an arrangement might be prone to differences caused by variations in the substrate velocity. The arrangement shown in FIG. 2 has the property that the first front sensor 241 and second front sensor 242 have an average position that is equal to the position of the back sensor 243, thereby reducing differences caused by variations in substrate velocity, while preventing interference between front and back sensors and thereby allowing the use of substrates that are not opaque.

In an example, the back sensor 243 may not be disposed midway between the first front sensor 241 and second front sensor 242 along the substrate path 250, but may be disposed at any other well-defined predetermined position as long as equation 1 is replaced by the more general equation 2. That is, the output sensor device 240 or the controller 100 may calculate the measured alignment difference, $E_{F2B}$, using the equation:

$$E_{F2B}=((((A\times T_{F1})+((1-A)\times T_{F2}))-T_B)\times V)+K \quad (2)$$

where A may be calculated from the respective positions $X_{F1}$, $X_{F2}$, and $X_B$ of the first front sensor 241, second front sensor 242, and back sensor 243 along the substrate path 250, according to equation 3:

$$A=(X_B-X_{F2})/(X_{F1}-X_{F2}) \quad (3)$$

Furthermore, in simplex overprinting, the arrangement of the input sensor device 230 and output sensor device 240 may be different. For example, the input sensor device 230 may be on the opposite side of the substrate path 250 to the position illustrated in FIG. 2, and the output sensor device 240 may comprise a single front sensor, for example first front sensor 241. The output sensor device 240 may measure an alignment difference by comparing the offset between the times of detection of the first registration mark and second registration mark to an expected offset based on the substrate velocity, for example.

Measurement of an alignment difference may allow a correction to the print position to be applied. For example, a position of a first registration mark printed on a substrate during an earlier printing operation may be detected (for example, by the input sensor device 130); a second registration mark may be printed (for example, by the printing device 120) on the substrate during a current printing operation at a position on the substrate relative to the first registration mark based on the detected position of the first registration mark and a correction factor; an alignment difference between the position of the first registration mark and the position of the second registration mark may be measured (for example, by the output sensor device 140); and a new correction factor for a subsequent printing operation may be calculated (for example, by the controller 100) by using the measured alignment difference. In an example, the new correction factor may equal the measured alignment difference. For example, if the measured alignment difference for a current print operation is $E_{(n)}$ then the print position $P_{n+1}$ may be calculated for a subsequent print operation by adding the measured alignment difference to the current print position $P_n$. That is, the print position $P_{n+1}$ may be calculated for a subsequent print operation according to equation 4:

$$P_{n+1}=P_n+E_{(n)} \quad (4)$$

In an example, relating particularly to duplex printing, the first registration mark may be on a first side of the substrate and the second registration mark may be printed on a second side of the substrate.

In the methods described below, a correction factor for correcting an alignment difference in a subsequent printing operation may be calculated by weighting a measured alignment difference between registration marks printed in two different printing operations according to a difference (which may be referred to as a correction derivative) between a measured alignment difference for the current printing operation and a measured alignment difference from a previous printing operation, for instance the preceding printing operation. The new correction factor may be used to weight the measured alignment difference. Because of the high mass and momentum of industrial printing devices, both the device itself and rolls of substrate for web-printing device, it may be unlikely that significant variations in the measured alignment difference will occur from one print operation to the next. Consequently, a large value for a correction derivative—that is, a large change in measured alignment difference relative to a preceding or other earlier printing operation—can be assumed to indicate an error in the sensors—that is, a sensor which is providing a false or misleading measurement due to internal or external factors affecting the measurement rather than an alignment difference. That is, when there is a sudden large change in the measured alignment difference, it is more likely to indicate that the positions of the registration marks have been detected incorrectly than that the positions of the registration marks have been printed incorrectly. The purpose of the weighting is therefore to reduce the applied correction to the print position when the difference between the current measured alignment difference and the previous measured alignment difference is large. This avoids the negative consequence of overcompensating for apparent alignment difference which is in fact due to sensor error. Such sensor error may, for instance be due to sensor movement or inaccuracies due to the nature of the substrate, such as it being glossy.

Figure 3:
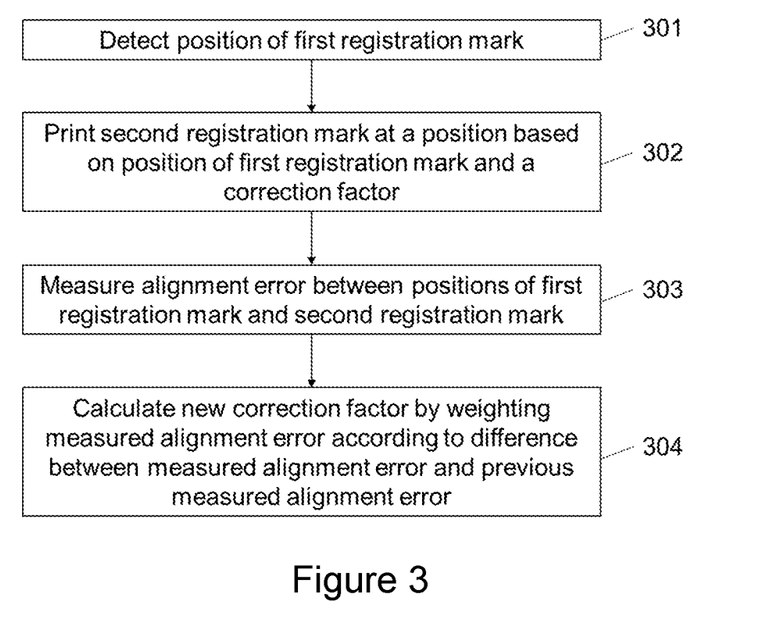
FIG. 3 shows an example of a method according to an example of the disclosure.

FIG. 3 shows an example of a method according to an example of the disclosure. Starting at 301, a position of a first registration mark printed on a substrate during an earlier printing operation is detected. This may be detected using the input sensor device 230 of FIG. 2.

At 302 a second registration mark is printed on the substrate, for instance using the print head 222 of FIG. 2, during a current printing operation at a position on the substrate relative to the first registration mark based on the detected position of the first registration mark and a correction factor. That is, during a current printing operation, a second registration mark may be printed at a position relative to the first registration mark on the substrate, for instance on a reverse side, for duplex printing, and the printed position of the second registration mark may be based on the detected position of the first registration mark and a correction factor. For duplex printing the second registration mark may suitable be printed at the intended exact opposite location of the first registration mark such that were the substrate to be transparent, a single registration mark would appear if the substrate were held up to the light (as described above). For simplex printing, the second registration mark may suitably be printed at a known intended offset relative to the first registration mark, for instance next to it.

At 303, an alignment difference between the position of the first registration mark and the position of the second registration mark is measured. As described above, the alignment difference may be calculated based on the offset between the positions or times of detection of the first registration mark and the second registration mark, for instance using the output sensor arrangement 240 of FIG. 2. Measuring the alignment difference may comprise comparing the measured offset to an expected offset.

At 304, a new correction factor for a subsequent printing operation is calculated by weighting the measured alignment difference according to a difference between the measured alignment difference and a previous measured alignment difference. That is, a new correction factor may be calculated for use in a subsequent printing operation. The calculation process may involve using the difference between the measured alignment difference for the current printing operation and the measured alignment difference for a previous printing operation to weight the measured alignment difference.

Figure 4:
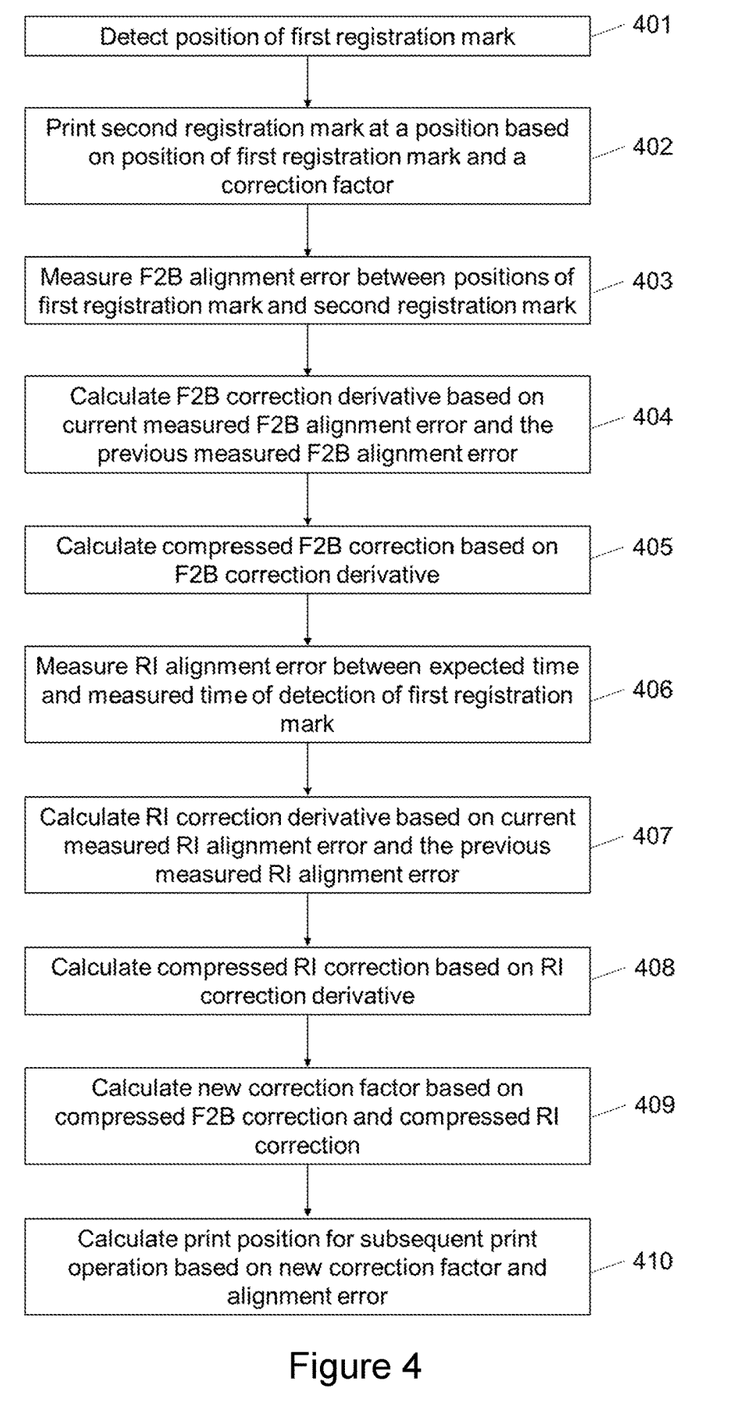
FIG. 4 shows an example of a method according to an example of the disclosure.

FIG. 4 shows an example of a method according to an example of the disclosure. In FIGS. 4, 401 and 402 are identical to 301 and 302 as described above in relation to FIG. 3. FIG. 4 expands upon the determination of the correction factor within FIG. 3, and it's use to calculate a print position for a subsequent print operation.

At 403, an alignment difference may be measured. The measured alignment difference may be a front-to-back (F2B) alignment difference comprising the difference between the position of a first registration mark on a first side of a substrate and the position of a second registration mark on a second side of the substrate which is intended to printed at a known position on the reverse side of the substrate relative to the first registration mark. That is, the measured F2B alignment difference $E_{F2B}$ may be the offset of a second registration mark on a second side of the substrate with respect to the first registration mark on the first side of the substrate, and may be calculated as described according to equation 1 or 2.

At 404-409, a new correction factor is calculated for a subsequent printing operation by weighting the measured alignment difference according to a difference between the measured alignment difference and a previous measured alignment difference. 404-409 generally correspond to 304 of FIG. 3, and will be described in more detail below.

At 404, a F2B correction derivative $\Delta_{F2B}$ may be calculated based on the current measured F2B alignment difference $E_{F2B(n)}$ (for the current completed print operation) and the most recent previous measured F2B alignment difference $E_{F2B(n-1)}$ (for the preceding completed print operation) according to equation 5:

$$\Delta_{F2B} = E_{F2B(n)} - E_{F2B(n-1)} \quad (5)$$

The measured F2B alignment difference $E_{F2B}$ may be an offset distance calculated from measured positions of the first and second registration marks on the substrate or may be an offset distance calculated from the difference in the times of detection of the first and second registration marks and the known or measured substrate speed. At 405, the compressed F2B correction $C_{F2B}$ may be calculated based on the F2B correction derivative $\Delta_{F2B}$ according to equation 6:

$$C_{F2B} = \max(\alpha_{F2B}, \beta_{F2B} - \text{abs}(\Delta_{F2B}/\gamma_{F2B})) \quad (6)$$

where max ( ) is the maximum value function, abs ( ) is the absolute value function, and $\alpha_{F2B}$, $\beta_{F2B}$, and $\gamma_{F2B}$ are predetermined parameters. In an example, $\alpha_{F2B}$ may have the value 0.6, $\beta_{F2B}$ may have the value 1.07, and $\gamma_{F2B}$ may have the value 1000. However, these are merely examples, and the parameters may be different according to different system characteristics. The parameters may be empirically determined and/or calibrated and set by the manufacturer and/or a user. For example, the parameters may be empirically determined by computer modelling and/or experimental testing for a range of devices.

At 406 an input alignment difference may be measured. The alignment difference may be a reinsertion (RI) alignment difference comprising the difference between the expected time of detection of the first registration mark and the measured time of detection of the first registration mark. The expected time of detection of the first registration mark may be calculated based on the measured time of detection of the first registration mark and the expected time between registration marks, which may be known or calculated based on system parameters such as substrate velocity and printed frame length (for web-printing). That is, the measured RI alignment difference $E_{RI}$ may be the difference between the time the first registration mark is expected to be detected and the time the first registration mark actually is detected.

At 407, a RI correction derivative $\Delta_{RI}$ may be calculated based on the current measured RI alignment difference $E_{RI(n)}$ and the most recent previous measured RI alignment difference $E_{RI(n-1)}$ according to equation 7:

$$\Delta_{RI} = E_{RI(n)} - E_{RI(n-1)} \quad (7)$$

In an example, the RI correction derivative $\Delta_{RI}$ may be calculated based on the current measured RI alignment difference $E_{RI(n)}$, the most recent previous measured RI alignment difference $E_{RI(n-1)}$, and the F2B correction derivative according to equation 7'. The inclusion of $\Delta_{F2B}$ takes account of the fact that the measurement/position control systems at both the input and the output of the printing device may give rise to differences—they may both give potentially faulty measurements. Accordingly, to compensate for changes the RI correction derivative $\Delta_{RI}$ may be calculated based on factors relating to both the input and the output. However, it will be appreciated that in alternative examples on differences arising from the input may be applied, according to equation (7).

$$\Delta_{RI} = E_{RI(n)} - E_{RI(n-1)} + \Delta_{F2B} \quad (7')$$

At 408, the compressed RI correction $C_{RI}$ may be calculated based on the RI correction derivative $\Delta_{RI}$ according to equation 8:

$$CR1 = \max(\alpha_{RI}, \beta_{RI} - \text{abs}(\Delta_{RI}/\gamma_{RI})) \quad (8)$$

where max ( ) is the maximum value function, abs ( ) is the absolute value function, and $\alpha_{RI}$, $\beta_{RI}$, and $\gamma_{RI}$ are predetermined parameters. In an example, $\alpha_{RI}$ may have the value 0.6, $\beta_{RI}$ may have the value 1.07, and $\gamma_{RI}$ may have the value 500. However, these are merely examples, and the parameters may be different according to different system characteristics. The parameters may be empirically determined and/or calibrated and set by the manufacturer and/or a user. For example, the parameters may be empirically determined by computer modelling and/or experimental testing for a range of devices.

At 409, the new correction factor $A_{n+1}$ may be calculated based on the compressed F2B correction $C_{F2B}$ and compressed RI correction $C_{RI}$ according to equation 9:

$$A_{n+1} = C_{F2B} \times C_{RI} \quad (9)$$

Consequently, a new correction factor is calculated for a subsequent printing operation by weighting the measured alignment difference according to a difference between the measured alignment difference and a previous measured alignment difference.

At 410, the print position $P_{n+1}$ of the second registration mark is calculated for a subsequent printing operation based on new correction factor $A_{n+1}$ and the measured alignment difference $E_{(n)}$ according to equation 10:

$$P_{n+1} = P_n + (A_{n+1} \times E_{(n)}) \quad (10)$$

where $P_{n+1}$ is the print position of the second registration mark in the subsequent printing operation, $P_n$ is the print position of the second registration mark in the current printing operation, and $E_{(n)}$ is either one of $E_{F2B(n)}$ and $E_{RI(n)}$.

In an example, the measured alignment difference may comprise both $E_{F2B(n)}$ and $E_{RI(n)}$ as described above, and the new correction factor $A_{n+1}$ may be calculated according to equation 10, wherein $E_{(n)}$ is $E_{F2B(n)}$.

In another example, the measured alignment difference may comprise $E_{F2B(n)}$ and 406, 407, and 408 may not be included. In this case, the new correction factor $A_{n+1}$ may be calculated according to equation 11:

$$A_{n+1} = C_{F2B} \quad (11)$$

and $E_{(n)}$ in equation 10 may be $E_{F2B(n)}$.

In another example, the measured alignment difference may comprise $E_{RI(n)}$ and 403, 404, and 405 may not be included. In this case, the new correction factor $A_{n+1}$ may be calculated according to equation 12:

$$A_{n+1} = C_{RI} \quad (12)$$

and $E_{(n)}$ in equation 10 may be $E_{RI(n)}$.

In an example, the new correction factor may not be calculated by multiplying $C_{F2B}$ and $C_{RI}$ according to equation 9. For example, $P_{n+1}$ may be calculated according to equation 13:

$$P_{n+1} = P_n + (C_{F2B} \times E_{F2B(n)}) + (C_{RI} \times E_{RI(n)}) \quad (13)$$

or any other suitable equation comprising the compressed corrections $C_{F2B}$ and $C_{RI}$.

In an example, $P_{n+1}$ may be calculated on the basis of a predetermined default print position $P_0$. That is, a predetermined default print position $P_0$ may replace the previous print position $P_n$ in equations 10 and 13.

In the methods described above, a new correction factor for a subsequent printing operation may be calculated by weighting the measured alignment difference according to a difference between the measured alignment difference and a previous measured alignment difference. The new correction factor $A_{n+1}$ may be used to weight the measured alignment difference $E_{(n)}$. The purpose of the compressed F2B correction $C_{F2B}$ and the compressed RI correction $C_{RI}$ is therefore to produce a new correction factor $A_{n+1}$ that reduces the applied correction to the print position $P_{n+1}$ when the difference between the current measured alignment difference and the previous measured alignment difference (i.e. $\Delta_{F2B}$ or $\Delta_{RI}$) is large. This may be achieved by setting the parameters $\alpha_{F2B}$, $\beta_{F2B}$, $\gamma_{F2B}$ and/or $\alpha_{RI}$, $\beta_{RI}$, $\gamma_{RI}$ appropriately for the system. To take the example of equation 6 (reproduced here for convenience, but the same considerations also apply to equation 8):

$$C_{F2B}=\max(\alpha_{F2B},\beta_{F2B}-\text{abs}(\Delta_{F2B}/\gamma_{F2B}))$$

it can be seen that when $\Delta_{F2B}$ is small (relative to $\gamma_{F2B}$) then $C_{F2B}$ will equal a value slightly less than $\beta_{F2B}$, and that when $\Delta_{F2B}$ is large (relative to $\gamma_{F2B}$) then $C_{F2B}$ will equal a value significantly less than $\beta_{F2B}$, unless this value would be less than $\alpha_{F2B}$, in which case $C_{F2B}$ will equal $\alpha_{F2B}$. $\alpha_{F2B}$ may therefore act as a minimum value for $C_{F2B}$, and $\alpha_{F2B}$, $\beta_{F2B}$, and $\gamma_{F2B}$ may define a threshold for use of a minimum weighting. Consequently, weighting the measured alignment difference comprises reducing the measured alignment difference as the difference between the measured alignment difference and a previous measured alignment difference increases, and weighting the measured alignment difference further comprises using a predetermined minimum weighting when the difference between the measured alignment difference and a previous measured alignment difference exceeds a predetermined threshold.

In an example, weighting the measured alignment difference may comprise reducing the measured alignment difference if the difference between the measured alignment difference and a previous measured alignment difference exceeds a first threshold. Weighting the measured alignment difference may comprise reducing the measured alignment difference by a greater amount if the difference exceeds a second threshold which is higher than the first threshold. Weighting the measured alignment difference may comprise applying no reduction if the difference is less than the first threshold. That is, rather than using equations 6 and 8 to calculate the compressed F2B correction $C_{F2B}$ and/or the compressed RI correction $C_{RI}$, the values for $C_{F2B}$ and/or $C_{RI}$ may be determined based on threshold values for the difference between the current measured alignment difference and the previous measured alignment difference (i.e. $\Delta_{F2B}$ or $\Delta_{RI}$). For example, values for $C_{F2B}$ and/or $C_{RI}$ may be determined by use of a lookup table, such as the example shown by Table 1:

TABLE 1

| Absolute correction derivative value, $(\text{abs}(\Delta_{F2B}))$ or $(\text{abs}(\Delta_{RI}))$ | Compressed correction value, $C_{F2B}$ or $C_{RI}$ |
|---|---|
| 0-70 | 1.0 |
| 71-120 | 0.9 |
| 121-160 | 0.8 |
| 161-200 | 0.7 |
| 201+ | 0.6 |

According to the example of Table 1, a compressed correction value of 1.0 may be used when the absolute correction derivative value is less or equal to 70, meaning that no reduction is applied to the measured alignment difference. When the absolute correction derivative value is in the range 71-120, a compressed correction value of 0.9 may be used to reduce the measured alignment difference, and so on. When the absolute correction derivative value is greater than 200, a minimum compressed correction value (i.e. a minimum weighting) of 0.6 may be used to reduce the measured alignment difference. It will be appreciated that the values of Table 1 are merely examples, and that the values may be different according to different system characteristics. The values may be empirically determined and/or calibrated and set by the manufacturer and/or a user.

Figure 5:
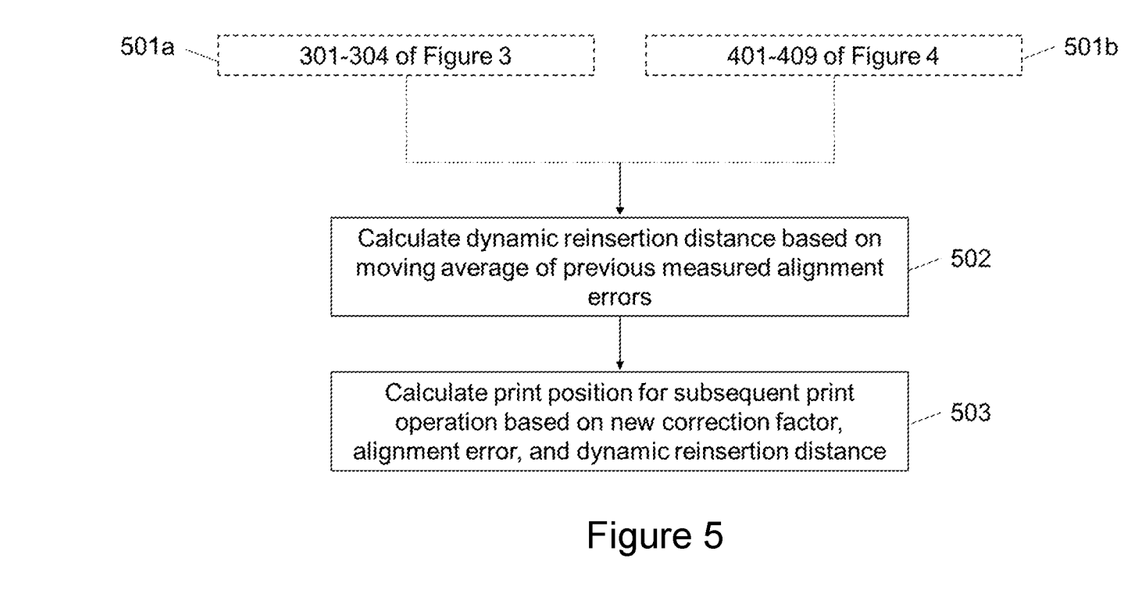
FIG. 5 shows an example of a method according to an example of the disclosure.

FIG. 5 shows an example of a method according to an example of the disclosure. In an example, the distance 260 between the point 251 at which the input sensor device 230 detects the first registration mark and the point 252 at which the print head 222 prints the image on the substrate may be called the reinsertion distance, R. This may be measured along the surface of the substrate. The reinsertion distance R for a specific system may be measured by the manufacturer or user and may be called the default reinsertion distance $R_0$. Oscillations and drift, and drift of the substrate, may cause the actual reinsertion distance $R_n$ for a current print operation to be different from the default reinsertion distance, which may contribute to a F2B alignment difference $E_{F2B(n)}$ between the first and second registration marks. This may be a further source of alignment difference in addition to the form of alignment difference resulting from sensor errors in the input sensor device 230 and the output sensor arrangement 240 of FIG. 2.

The method may begin at 501a with the method 301-304 of FIG. 3, or at 501b with the method 401-409 of FIG. 4 (or the modifications of this method described subsequently to the description of those figures. At 502, a moving average of previous measured alignment differences may be calculated, in accordance with equation 14:

$$R_{n+1}=R_0+((\Sigma^n_{i=n-(m-1)}E_{F2B(i)})/m) \qquad (14)$$

where m is a predetermined number of previous measured F2B alignment differences to be used in the moving average. For example, if the previous four measured F2B alignment differences are to be used (i.e. m=4) and the current print operation is n=10, then:

$$R_{11}=R_0+((E_{F2B(7)}+E_{F2B(8)}+E_{F2B(9)}+E_{F2B(10)})/4)$$

$R_{n+1}$ may be called the dynamic reinsertion distance. In some examples, m might suitably be 16. If the output sensor arrangement 240 is the three-sensor arrangement illustrated in FIG. 2, then $E_{F2B(i)}$ may be calculated according to equation 1.

At 503, the print position P for a subsequent printing operation may be calculated based on the new correction factor, the measured alignment difference, and the dynamic reinsertion distance. In an example, printing a second registration mark on the substrate during a current printing operation at a position on the substrate relative to the first registration mark may therefore be further based on a moving average of previous measured alignment differences. In an example, printing a second registration mark on the substrate during a current printing operation at a position on the substrate relative to the first registration mark comprises: calculating an adjusted sensor to printing position distance (i.e., dynamic reinsertion distance) by adding a moving average of previous measured alignment differences to a nominal distance (or a previously calculated distance) between an input sensor device 130 detecting a position of a first registration mark printed on a substrate during an earlier printing operation and a printing device 120 to print the second registration mark; determining a printing time for printing the second registration mark according to the adjusted sensor to printing position distance, a substrate moving speed and the detected position of the first registration mark; and adjusting the determined printing time according to the correction factor.

In an example, the print position P described above may be based on the dynamic reinsertion distance R, without the calculation of a separate correction factor. That is, a position of a first registration mark printed on a substrate during an earlier printing operation may be measured; a second registration mark may be printed on the substrate during a current printing operation at a position on the substrate relative to the first registration mark based on the detected position of the first registration mark and a moving average of previous measured alignment differences; a current alignment difference between the position of the first registration mark and the position of the second registration mark may be measured; and a new moving average of the current measured alignment difference and a previous measured alignment difference may be calculated for a subsequent printing operation.

As described above, a method may be provided comprising: detecting a position of a first registration mark printed on a substrate during an earlier printing operation; printing a second registration mark on the substrate during a current printing operation at a position on the substrate relative to the first registration mark based on the detected position of the first registration mark and a correction factor; measuring an alignment difference between the position of the first registration mark and the position of the second registration mark; and calculating a new correction factor for a subsequent printing operation by weighting the measured alignment difference according to a difference between the measured alignment difference and a previous measured alignment difference.

As described above, an apparatus may be provided comprising: an input sensor device 130 to detect a position of a first registration mark printed on a substrate during an earlier printing operation; a printing device 120 to print a second registration mark on the substrate during a current printing operation at a position on the substrate relative to the first registration mark based on the detected position of the first registration mark and a correction factor; an output sensor device 140 to measure an alignment difference between the position of the first registration mark and the position of the second registration mark; and a controller 100 to calculate a new correction factor for a subsequent printing operation by weighting the measured alignment difference according to a difference between the measured alignment difference and a previous measured alignment difference.

As described above, a method may be provided comprising: detecting a position of a first registration mark printed on a first side of a substrate during an earlier printing operation; printing a second registration mark on a second side of the substrate during a current printing operation at a position on the substrate relative to the first registration mark based on the detected position of the first registration mark and a correction factor; measuring an alignment difference between the position of the first registration mark and the position of the second registration mark; and calculating a new correction factor for a subsequent printing operation by using the measured alignment difference.

As described above, an apparatus may be provided comprising: an input sensor device 130 to detect a position of a first registration mark printed on a first side of a substrate during an earlier printing operation; a printing device 120 to print a second registration mark on a second side of the substrate during a current printing operation at a position on the substrate relative to the first registration mark based on the detected position of the first registration mark and a correction factor; an output sensor device 140 to measure an alignment difference between the position of the first registration mark and the position of the second registration mark; and a controller 100 to calculate a new correction factor for a subsequent printing operation by using the measured alignment difference.

As described above, a method may be provided comprising: detecting a position of a first registration mark printed on a substrate during an earlier printing operation; printing a second registration mark on the substrate during a current printing operation at a position on the substrate relative to the first registration mark based on the detected position of the first registration mark and a moving average of previous measured alignment differences; measuring a current alignment difference between the position of the first registration mark and the position of the second registration mark; and calculating, for a subsequent printing operation, a new moving average of the current measured alignment difference and a previous measured alignment difference.

As described above, an apparatus may be provided comprising: an input sensor device 130 to detect a position of a first registration mark printed on a substrate during an earlier printing operation; a printing device 120 to print a second registration mark on the substrate during a current printing operation at a position on the substrate relative to the first registration mark based on the detected position of the first registration mark and a moving average of previous measured alignment differences; an output sensor device 140 to measure an alignment difference between the position of the first registration mark and the position of the second registration mark; and a controller 100 to calculate, for a subsequent printing operation, a new moving average of the current measured alignment difference and a previous measured alignment difference.

As described above, a method may be provided comprising: measuring an alignment difference between the position of a first registration mark printed on a first side of a substrate and the position of a second registration mark printed on a second side of a substrate; wherein measuring the alignment difference comprises: detecting, by a first front sensor 241, the second registration mark on the second side of the substrate; detecting, by a back sensor 243, the first registration mark on the first side of the substrate; and detecting, by a second front sensor 242, the second registration mark on a second side of a substrate; wherein the back sensor 243 is disposed at a predetermined position between the first front sensor 241 and the second front sensor 242 along the substrate path 250.

As described above, an apparatus may be provided comprising: an output sensor device 140 to measure an alignment difference between the position of a first registration mark printed on a first side of a substrate and the position of a second registration mark printed on a second side of a substrate; wherein the output sensor device 140 comprises: a back sensor 243 to detect the first registration mark on the first side of the substrate; and a first front sensor 241 and a second front sensor 242 to detect the second registration mark on the second side of a substrate; wherein the back sensor 243 is disposed at a predetermined position between the first front sensor 241 and the second front sensor 242 along the substrate path 250.

As described above, a non-transitory machine readable storage medium 202 encoded with instructions executable by a processor 201 is provided, the machine readable storage medium 202 comprising: instructions to detect a position of a first registration mark on a substrate; instructions to print a second registration mark on the substrate at a position on the substrate relative to the first registration mark based on the detected position of the first registration mark and a previously calculated correction factor; instructions to measure an alignment difference between the position of the first registration mark and the position of the second registration mark; and instructions to calculate a new correction factor by weighting the measured alignment difference according to a difference between the measured alignment difference and a previous measured alignment difference.

As described above, for any of the above examples, detecting, measuring, and/or determining of a position may comprise detecting, measuring, and/or determining of a time and may further comprise converting between a time and a position, or vice versa, based on the substrate velocity. Certain examples presented above relate specifically to web-printing in which content is printed on a reel of substrate. However, the examples are equally applicable to sheet fed printing systems. Certain examples presented above increase registration accuracy where two or more printing operations performed at different times take place on the same portion of a substrate (on both sides or a single side). The use of weighting to produce a correction factor may result in alignment accuracy which exceeds the worst-case scenario for sensor accuracy by mitigating the effects of large changes in measured alignment which may result from sensor error alone. Certain examples presented above may reduce or remove entirely the effects of changes in substrate speed when measuring alignment, through the use of a sensor arrangement with three or more sensors.

It will be appreciated that equations 1-14 set out above are examples, and could be modified for different systems and system characteristics. For example, the equations may be modified according to empirical results obtained by computer modelling and/or experimental testing for a range of devices. As an example, additional or alternative weighting parameters may be applied to any or all of the parameters derived from measurements, or weighting constants added. Such weighting parameters or constants noted above are not fixed and may vary substantially between different printing systems.

All of the features disclosed in this specification (including any accompanying claims, abstract, and drawings) may be combined in any combination, except combinations where some of such features are mutually exclusive.

Each feature disclosed in this specification, including any accompanying claims, abstract, and drawings), may be replaced by alternative features serving the same, equivalent, or similar purpose, unless expressly stated otherwise. Thus, unless expressly stated otherwise, each feature disclosed is one example of a generic series of equivalent or similar features.

The present teachings are not restricted to the details of any foregoing examples. Any novel combination of the features disclosed in this specification (including any accompanying claims, abstract, and drawings) may be envisaged. The claims should not be construed to cover merely the foregoing examples, but also any variants which fall within the scope of the claims.

The invention claimed is:

1. A method comprising:
    detecting a position of a first registration mark printed on a substrate during an earlier printing operation;
    printing a second registration mark on the substrate during a current printing operation at a position on the substrate relative to the first registration mark based on the detected position of the first registration mark and a correction factor;
    measuring an alignment difference between the position of the first registration mark and the position of the second registration mark; and
    calculating a new correction factor for a subsequent printing operation by weighting the measured alignment difference according to a difference between the measured alignment difference and a previous measured alignment difference.

2. The method of claim 1, wherein weighting the measured alignment difference comprises reducing the measured alignment difference as the difference between the measured alignment difference and a previous measured alignment difference increases.

3. The method of claim 2, wherein weighting the measured alignment difference further comprises using a predetermined minimum weighting when the difference between the measured alignment difference and a previous measured alignment difference exceeds a first threshold.

4. The method of claim 1, wherein weighting the measured alignment difference comprises reducing the measured alignment difference if the difference between the measured alignment difference and a previous measured alignment difference exceeds a second threshold.

5. The method of claim 4, wherein the reducing the measured alignment difference comprises applying a percentage reduction to the measured alignment difference.

6. The method of claim 5, wherein the weighting the measured alignment difference comprises reducing the measured alignment difference by a greater amount if the difference exceeds a second threshold which is higher than the second threshold.

7. The method of claim 6, wherein the weighting the measured alignment difference comprises applying no reduction if the difference is less than the second threshold.

8. The method of claim 7, wherein the weighting the measured alignment difference further comprises using a predetermined minimum weighting when the difference between the measured alignment difference and a previous measured alignment difference exceeds a third predetermined threshold.

9. The method of claim 1, wherein the measuring the alignment difference comprising measuring a detection time offset between a time of detection of the first registration mark and a time of detection of the second registration mark and converting the time offset to an alignment difference.

10. The method of claim 9, wherein the time of detection of the first registration mark comprises an average of two separate times of detection of the first registration mark at two separate sensors.

11. The method of claim 1, wherein the measured alignment difference further comprises a reinsertion alignment difference comprising the difference between an expected time of detection of the first registration mark and a measured time of detection of the first registration mark.

12. The method of claim 1, wherein the printing a second registration mark on the substrate during a current printing operation at a position on the substrate relative to the first registration mark comprises:

calculating an adjusted sensor to printing position distance by adding moving average of previous measured alignment differences to a nominal distance between an input sensor device detecting a position of a first registration mark printed on the substrate during an earlier printing operation and a printing device to print the second registration mark;

determining a printing time for printing the second registration mark according to the adjusted sensor to printing position distance, a substrate moving speed and the detected position of the first registration mark; and adjusting the determined printing time according to the correction factor.

13. An apparatus comprising:

an input sensor device to detect a position of a first registration mark printed on a substrate during an earlier printing operation;

a printing device to print a second registration mark on the substrate during a current printing operation at a position on the substrate relative to the first registration mark based on the detected position of the first registration mark and a correction factor;

an output sensor device to measure an alignment difference between the position of the first registration mark and the position of the second registration mark; and a controller to calculate a new correction factor for a subsequent printing operation by weighting the measured alignment difference according to a difference between the measured alignment difference and a previous measured alignment difference.

14. The apparatus of claim 13, wherein the output sensor device comprises:

a back sensor to detect the first registration mark on a first side of the substrate;

a first front sensor and a second front sensor to detect the second registration mark on a second side of the substrate;

wherein the back sensor is disposed at a predetermined position between the first front sensor and the second front sensor along a substrate path.

15. A non-transitory machine readable storage medium encoded with instructions executable by a processor, the machine readable storage medium comprising:

instructions to detect a position of a first registration mark on a substrate;

instructions to print a second registration mark on the substrate at a position on the substrate relative to the first registration mark based on the detected position of the first registration mark and a previously calculated correction factor;

instructions to measure an alignment difference between the position of the first registration mark and the position of the second registration mark; and instructions to calculate a new correction factor by weighting the measured alignment difference according to a difference between the measured alignment difference and a previous measured alignment difference.

* * * * *